United States Patent
Kraus et al.

(10) Patent No.: US 7,571,484 B2
(45) Date of Patent: Aug. 4, 2009

(54) SYSTEM AND METHOD FOR IMAGE AUTHENTICATION OF A RESOURCE-SPARING OPERATING SYSTEM

(75) Inventors: Mark Kraus, Redmond, WA (US); Sudhakar Prabhu, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 698 days.

(21) Appl. No.: 10/727,479

(22) Filed: Dec. 4, 2003

(65) Prior Publication Data

US 2005/0125407 A1    Jun. 9, 2005

(51) Int. Cl.
*H04L 9/00* (2006.01)
(52) U.S. Cl. ......................... 726/26; 711/216
(58) Field of Classification Search ................ 711/100, 711/101, 104, 163, 216; 382/268; 358/3.28; 726/2, 26–27, 1; 713/1–2, 152, 165, 189; 380/202; 370/229, 255, 395.32
See application file for complete search history.

(56) References Cited

U.S. PATENT DOCUMENTS

| | | | | |
|---|---|---|---|---|
| 5,579,522 A * | 11/1996 | Christeson et al. | ............. | 713/2 |
| 5,781,773 A * | 7/1998 | Vanderpool et al. | .......... | 707/100 |
| 5,870,520 A * | 2/1999 | Lee et al. | ........................ | 714/6 |
| 5,880,720 A * | 3/1999 | Iwafune et al. | ................. | 725/24 |
| 5,884,298 A * | 3/1999 | Smith et al. | ..................... | 707/2 |
| 6,006,034 A * | 12/1999 | Heath et al. | .................. | 717/170 |
| 6,112,242 A * | 8/2000 | Jois et al. | ..................... | 709/225 |
| 6,202,070 B1 * | 3/2001 | Nguyen et al. | ............ | 707/104.1 |
| 6,574,736 B1 * | 6/2003 | Andrews | ....................... | 726/21 |
| 6,615,329 B2 * | 9/2003 | Scott et al. | .................... | 711/163 |
| 6,678,833 B1 * | 1/2004 | Grawrock | .................... | 713/401 |
| 6,684,326 B1 * | 1/2004 | Cromer et al. | ................. | 713/2 |
| 6,704,733 B2 * | 3/2004 | Clark et al. | .................... | 707/10 |
| 6,880,086 B2 * | 4/2005 | Kidder et al. | ................ | 713/191 |
| 6,931,548 B2 * | 8/2005 | O'Connor | ..................... | 726/22 |
| 6,954,854 B1 * | 10/2005 | Miura et al. | ................. | 713/168 |
| 6,971,018 B1 * | 11/2005 | Witt et al. | .................... | 713/187 |
| 7,102,973 B1 * | 9/2006 | Carson | ..................... | 369/53.21 |
| 7,237,126 B2 * | 6/2007 | Neufeld | ....................... | 713/194 |
| 7,356,707 B2 * | 4/2008 | Foster et al. | ................. | 713/189 |
| 7,376,966 B2 * | 5/2008 | Okigami | ........................ | 726/4 |

\* cited by examiner

*Primary Examiner*—Kimyen Vu
*Assistant Examiner*—Leynna T Truvan
(74) *Attorney, Agent, or Firm*—Lee & Hayes, PLLC (57) ABSTRACT

A file system protection mechanism for an operating system image for a portable computing device is provided to assist in ensuring a good user experience. A signed catalog file is embedded in a resource-sparing operating system (OS), such as a Windows CE image, for security enhancement and load verification purposes. The invention performs various checks on the image and the signature of the image to ensure that image has not been maliciously modified and that it complies with a release standard. Such a mechanism is important to protect image loads from external threats made possible by, e.g. recent incorporation of broadband wireless and wireline connectivity for portable computing devices. The signing technique includes creating a signed catalog of the image and embedding that catalog into the image as it is loaded onto the portable computing device.

20 Claims, 7 Drawing Sheets

SYSTEM AND METHOD FOR IMAGE AUTHENTICATION OF A RESOURCE-SPARING OPERATING SYSTEM

FIELD OF THE INVENTION

The present invention relates generally to file system protection methods used to ensure a good user experience, and more particularly to systems and methods for authentication of an operating system image for a resource-sparing operating system.

BACKGROUND OF THE INVENTION

As wireless technology continues to advance, consumers are demanding new devices that take advantage of such advances to increase their productivity and to give them increased mobility while computing. In response to this demand, an ever increasing number of portable computing devices offering an ever increasing number of features and advantages have been developed.

However, due to power and size constraints for these truly portable devices, as opposed to laptop computers, their functionality is typically limited as compared to one's desktop computer. Similarly, while a number of these devices can synchronize with a user's desktop computer, user settings and other display items are different or must be separately set by the user. Despite these shortcomings, the mobility provided by these portable devices have made them highly desired by consumers. However, many consumers desire more functionality and would prefer to have all of their display and user preferences from their desktop computer system available while using a portable device.

To satisfy this desire, a new generation of portable device has been developed. A Smart Display is a wireless, touch screen monitor that allows users to access and use their home computer from different rooms in their home. With this new portable device, the users may surf the Web from the couch, check e-mail messages while lying in bed, download recipes in the kitchen, or share digital pictures on the patio, to name just a few. Further, a Smart Display can extend the power of the users desktop operating system, e.g. Windows XP Professional operating system. This delivers access to the information, applications, and services a user enjoys most, to any room in the users' home, any time they want.

This new generation of portable device allows one to free oneself from the home office with a cordless connection to their desktop system. This freedom is enabled by an integrated wireless connection via an integrated 802.11 wireless antenna that enables one to connect and access his or her desktop computer remotely from any room in the home. The Smart Display includes a touch-sensitive screen. This allows a user to leave the mouse and keyboard behind. The Smart Display's touch-sensitive screen allows the user to navigate his or her PC and enter data using a stylus. These new devices also feature flexible input and navigation. The Smart Display features a complete, customizable on-screen keyboard, writing pad with handwriting recognition, right-click and hover options, and support for a mouse and keyboard. A distinct advantage of these devices are their thin, portable designs. Smart Display devices are built for portability and comfort, so a user can enjoy relaxed computing around the house. With no hard drive or fans, the devices run quietly for unobtrusive computing.

As desired by consumers, these new portable devices are very empowering. Unlike other portable devices, these new devices extend the power of a user's personalized computing experience. Because the Smart Display connects a user to his or her PC, the user can automatically enjoy his or her familiar, personalized settings, custom views, and favorites. Additionally, the user is already familiar with the files and applications made available through the Smart Display. A user no longer needs to worry about downloading new applications, synchronizing files, or resaving favorites when the user uses the Smart Display. The user will have access to his or her desktop computer's existing components, files, and applications so the user can, e.g. surf the Web with his or her favorite Internet browser software in the kitchen, use your e-mail and instant-messaging programs from the couch, or share your photos with friends in the family room. With a Smart Display, the power of the user's existing Internet services is seamlessly extended to every room. While the desktop computer runs in the den or office, the Web services move around the home with the user and his or her Smart Display, without any new sign up tasks, fees, or hassles.

Like most portable devices, the Smart Display is built on a Windows CE platform. As such, Smart Displays can also run a limited set of local Windows CE applications that provide end-user functionality when not connected to a personal computer. As will be recognized by those skilled in the art, an image of the Windows CE operating system is loaded into flash RAM to provide the functionality of the device. However, should this operating system image be corrupted in some way, either by a malicious entity or because an image for another make/model device were mistakenly loaded into the device, the user experience would be greatly diminished.

There exists, therefore, a need in the art for a system and method of protection for an operating system image for a portable computing device to ensure a good user experience.

BRIEF SUMMARY OF THE INVENTION

The present invention provides a new and improved file system protection mechanism for an operating system image for a portable computing device to assist in ensuring a good user experience. More particularly, the present invention provides a mechanism for embedding a signed catalog file in a resource-sparing operating system (OS), such as a Windows CE image, for security enhancement and load verification purposes. Such a mechanism is important to protect image loads from external threats made possible by, e.g. recent incorporation of broadband wireless and wireline connectivity for portable computing devices running Windows CE. The signing technique includes creating a signed catalog of the image and embedding that catalog into the image as it is loaded onto the portable computing device.

A feature of the system and method of the present invention is enforcement of a system of checks that will ensure a minimum level of quality and functionality of all portable computing, e.g. Smart Display, devices. Indeed, it should be noted that the image signing process of the present invention is used primarily as a file system protection mechanism to ensure a good user experience, and is not primarily a security feature per se. As such, it is a goal of the invention to block a malicious download of non-approved images or OS. Further, it is a goal to prevent software-only attacks on a portable computing device that would alter the bootloader or image. File signing acts as a control mechanism for enforcement of original equipment manufacturer (OEM) approval of new images. The system and method of the present invention also preferably prevents incorrect, untested images from being downloaded onto a device due to accidental postings of unsigned images to a web update site or other distribution. Finally, the present invention provides a process for image signing that allows an OEM to fully test the bootloader, image and image signing components prior to submission for a release signature. In this way, there should be no risk of the release signature failing and holding up production.

Consumers have a high expectation for functionality and quality for their portable computing devices. The image signature provided by the system and methods of the present invention helps enforce the Compliance Program to insure minimal levels of performance and protection from many common attacks.

In a preferred embodiment of the present invention, the image is checked in various ways to ensure that it has not been maliciously modified, and that it conforms to a release standard. These checks include in one embodiment the calculation of a hash of the image, which is then compared to a hash that is extracted from the signed catalog file embedded in the image. Preferably, the signature of the catalog file is also verified. Additionally, in an embodiment of the invention, make and model attributes stored in the catalog file are compared with make and model attributes of the device to ensure that an image for another device is not inadvertently loaded on the wrong device.

BRIEF DESCRIPTION OF THE DRAWINGS

The accompanying drawings incorporated in and forming a part of the specification illustrate several aspects of the present invention, and together with the description serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Turning to the drawings, wherein like reference numerals refer to like elements, the invention is illustrated as being implemented in a suitable computing environment. Although not required, the invention will be described in the general context of computer-executable instructions, such as program modules, being executed by a computing device. Generally, program modules include routines, programs, objects, components, data structures, etc. that perform particular tasks or implement particular abstract data types. Moreover, those skilled in the art will appreciate that the invention may be practiced with other computer system configurations, including hand-held devices, portable computing devices, Smart Displays, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices. In view of the wide application for the system and methods of the present invention, the following discussion will focus on one exemplary application, to wit a Smart Display device and its associated personal desktop computer system. However, such exemplary discussion should not be taken as a limitation on the scope of the invention as defined by the appended claims.

Figure 1:
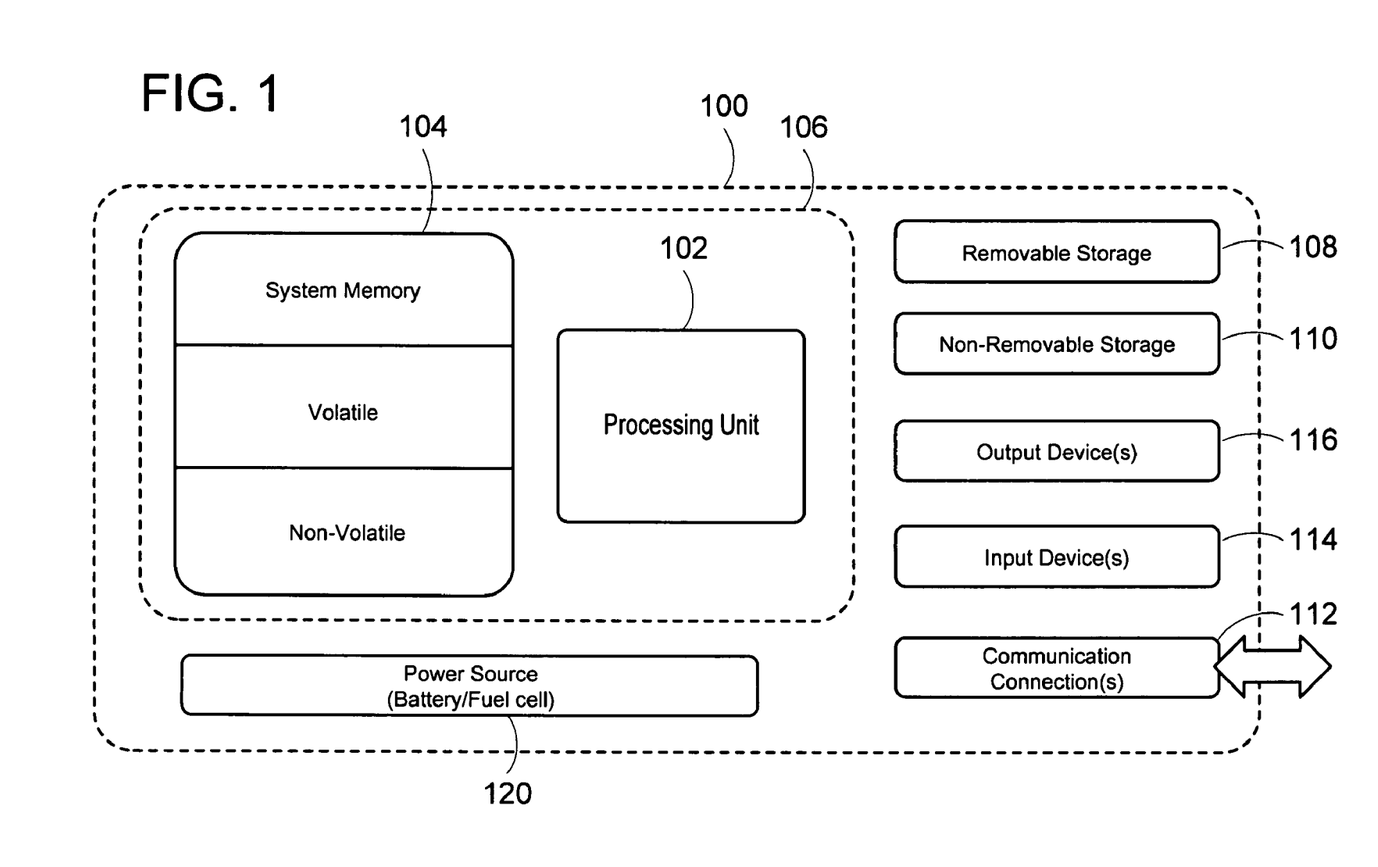
FIG. 1 is a block diagram generally illustrating an exemplary portable computer system on which the present invention may reside.

FIG. 1 shows an exemplary computing device 100 for implementing an embodiment of the invention. In its most basic configuration, the computing device 100 includes at least a processing unit 102 and a memory 104. Depending on the exact configuration and type of computing device, the memory 104 may be volatile (such as RAM), non-volatile (such as ROM, flash memory, etc.) or some combination of the two. This most basic configuration is illustrated in FIG. 1 by a dashed line 106. Additionally, the device 100 may also have additional features/functionality. For example, the device 100 may also include additional storage (removable and/or non-removable) including, but not limited to, magnetic or optical disks or tapes. Such additional storage is illustrated in FIG. 1 by a removable storage 108 and a non-removable storage 110. Computer storage media includes volatile and nonvolatile, removable and non-removable media implemented in any method or technology for storage of information such as computer readable instructions, data structures, program modules or other data. The memory 104, the removable storage 108 and the non-removable storage 110 are all examples of computer storage media. Computer storage media includes, but is not limited to, RAM, ROM, EEPROM, flash memory or other memory technology, CDROM, digital versatile disks (DVD) or other optical storage, magnetic cassettes, magnetic tape, magnetic disk storage or other magnetic storage devices, or any other medium which can be used to store the desired information and which can accessed by the device 100. Any such computer storage media may be part of the device 100.

The device 100 may also contain one or more communications connections 112 that allow the device to communicate with other devices. The communications connections 112 are an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. As discussed above, the term computer readable media as used herein includes both storage media and communication media.

The device 100 may also have one or more input devices 114 such as keyboard, mouse, pen, voice input device, touch-input device, etc. One or more output devices 116 such as a display, speakers, printer, etc. may also be included. All these devices are well known in the art and need not be discussed at greater length here.

Figure 2:
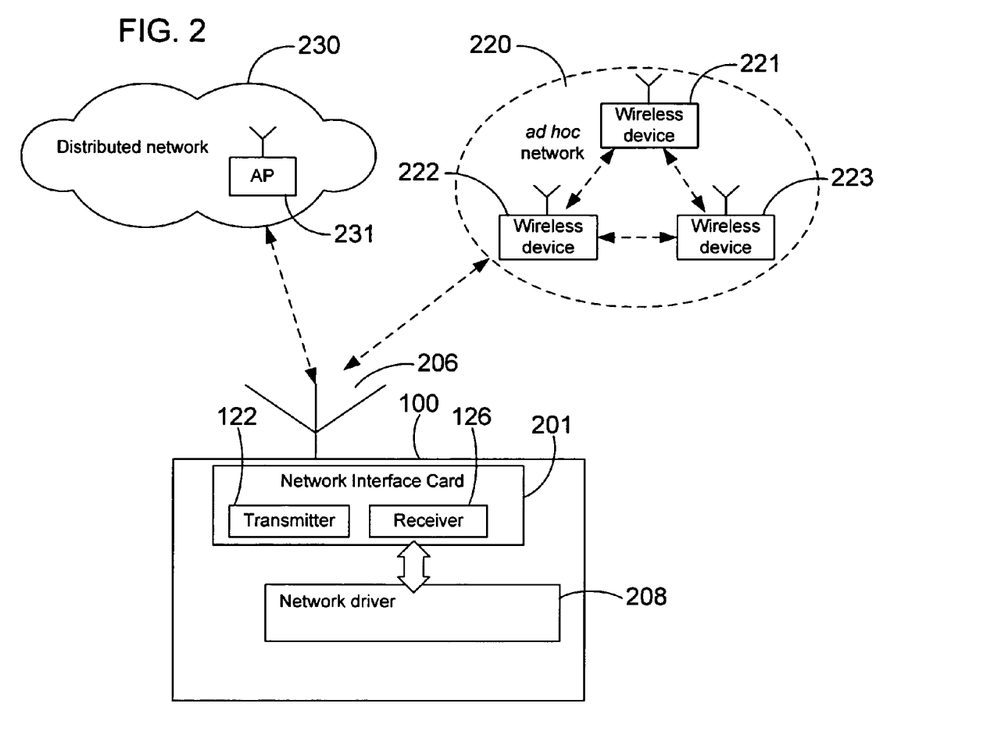
FIG. 2 is a block diagram generally illustrating an exemplary wireless portable computer system to which the present invention is particularly well suited.

In various embodiments of the present invention, the device 100 is configured as a wireless mobile device. To that end, the device 100 is provided with a portable power source 120, such as a battery pack, a fuel cell, or the like. The power source 120 provides power for computations and wireless data transmissions by the device 100. As shown in FIG. 2, the wireless computing device 100 may include a network interface card (NIC) 201 for wirelessly communicating with different types of wireless networks. The NIC 201 includes a transmitter 122, which is coupled to an antenna 206 for transmitting data wirelessly over a suitable frequency channel. A receiver 126 is also coupled to the antenna 206 for receiving communication packets wirelessly transmitted from the networks that the device is communicating with. The network interface module 201 and the antenna 206 are part of the communication connections 112 in FIG. 1. In one embodiment, the network interface module 201 employs wireless configuration service over the IEEE 802.11 wireless connections to ease network configuration, including infrastructure networks and ad hoc networks. An exemplary network interface module is PCMCIA wireless card. It will be appreciated that the interface type and physical configuration of the network interface module is not critical to the invention. For instance, the interface type could be PCI or another type and the network interface module does not have to reside on a separate card. It may be included on the motherboard of the computer or even possibly built into the processor in the future.

Through the wireless network interface module, the wireless computing device 100 may communicate with different types of wireless networks. For instance, in the illustrated environment of FIG. 2, the wireless device 100 may be connected wirelessly to an infrastructure network 230 through an access point 231 thereof. The wireless device 100 may also be part of a peer-to-peer network 220, also referred to as an ad hoc network, that includes other wireless devices, such as the wireless devices 221, 222, and 223. Alternatively, as in the case of the Smart Display, the device 100 couples to a single desktop computer. Before connecting to either the access point 231 of the infrastructure network or the ad hoc network 220, the wireless device 100 may be in a state of searching for devices that belong to the network by periodically scanning actively by sending probe requests and scanning for probe response signals transmitted by the access point or other devices. Alternatively, the wireless device 100 may search passively by scanning for beacons transmitted by Access Points. A network driver 208 controls the operation of the network interface module 201. The network driver 208 is either part of the operating system of the wireless device 100 or a separate executable program running on the wireless device 100.

In the description that follows, the invention will be described with reference to acts and symbolic representations of operations that are performed by one or more computer, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

With this context in mind, and turning now to the exemplary embodiment of the invention utilized with a wireless, portable Smart Display device, the system and methods of the present invention will be discussed more fully. As introduced above, the present invention provides enforcement of a system of checks that will ensure a minimum level of quality and functionality of all portable computing, e.g. Smart Display, devices. Indeed, the image signing process of the present invention is used primarily as a file system protection mechanism to ensure a good user experience, and is not primarily a security feature per se. The system and methods of the present invention block malicious downloads of non-approved images or OS, prevent attacks on a portable computing device that would alter the bootloader or image, act as a control mechanism for enforcement of original equipment manufacturer (OEM) approval of new images, prevent incorrect, untested images from being downloaded onto a device, and provide a process for image signing that allows an OEM to fully test the bootloader, image and image signing components prior to submission for a release signature. As should be recognized by those skilled in the art, and in view of the context of the discussion herein, the term image refers to a duplicate, copy, or representation of all or part of a file, a program, or data, and is used primarily to refer to an image of the operating system (OS).

To ensure that a proper image is loaded on a portable device, the system and methods of the present invention embed a signed catalog file in the resource-sparing OS, such as a Windows CE image. This image's signed catalog is then checked in the portable device at two different times or in two circumstances. This first time the image is checked for a proper signed catalog file is prior to committing an update to Flash memory. The second instance that the image is checked for a proper signed catalog file is each time the device is either warm or cold reset. Each of these instances will be discussed more fully below.

The first instance at which the image is checked for a proper signed catalog file is during an image update. Typically, an updated image is downloaded by the user to the device's RAM using the Update process via either a USB or LAN port. However, before the device's bootloader 300 (see FIG. 3), which is typically located in protected Flash memory 302, starts the process of erasing and programming the unprotected Flash memory 304 with the new device image 306, the crypto module 308 in the bootloader 300 is invoked to examine the image's signed catalog file 310 and to determine if the update process may proceed. The attributes for the downloaded image are also examined to verify that the image is appropriate for the make and model of device.

Figure 3:
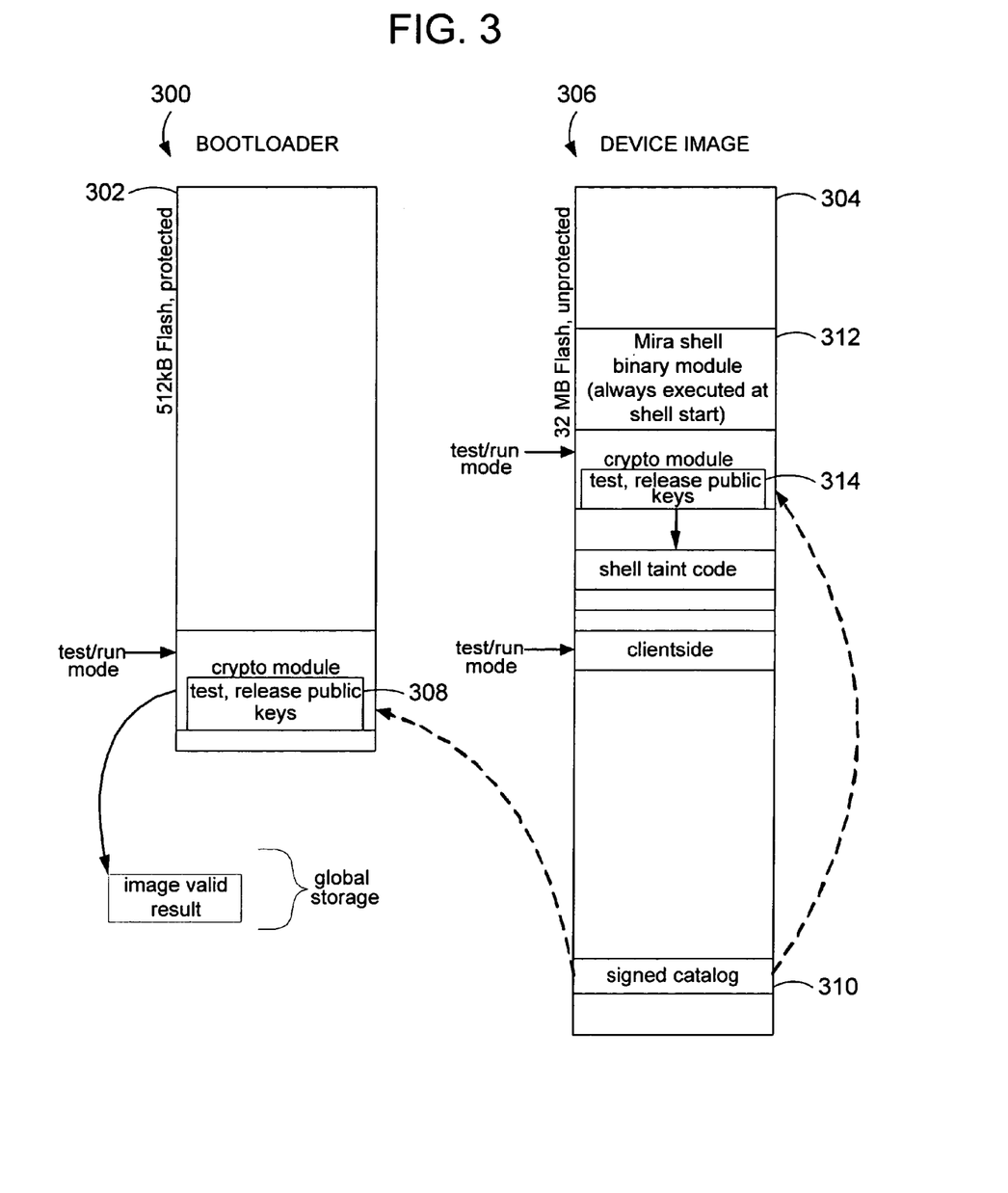
FIG. 3 is a simplified signature module diagram illustrating aspects of the present invention.
Figure 4A:
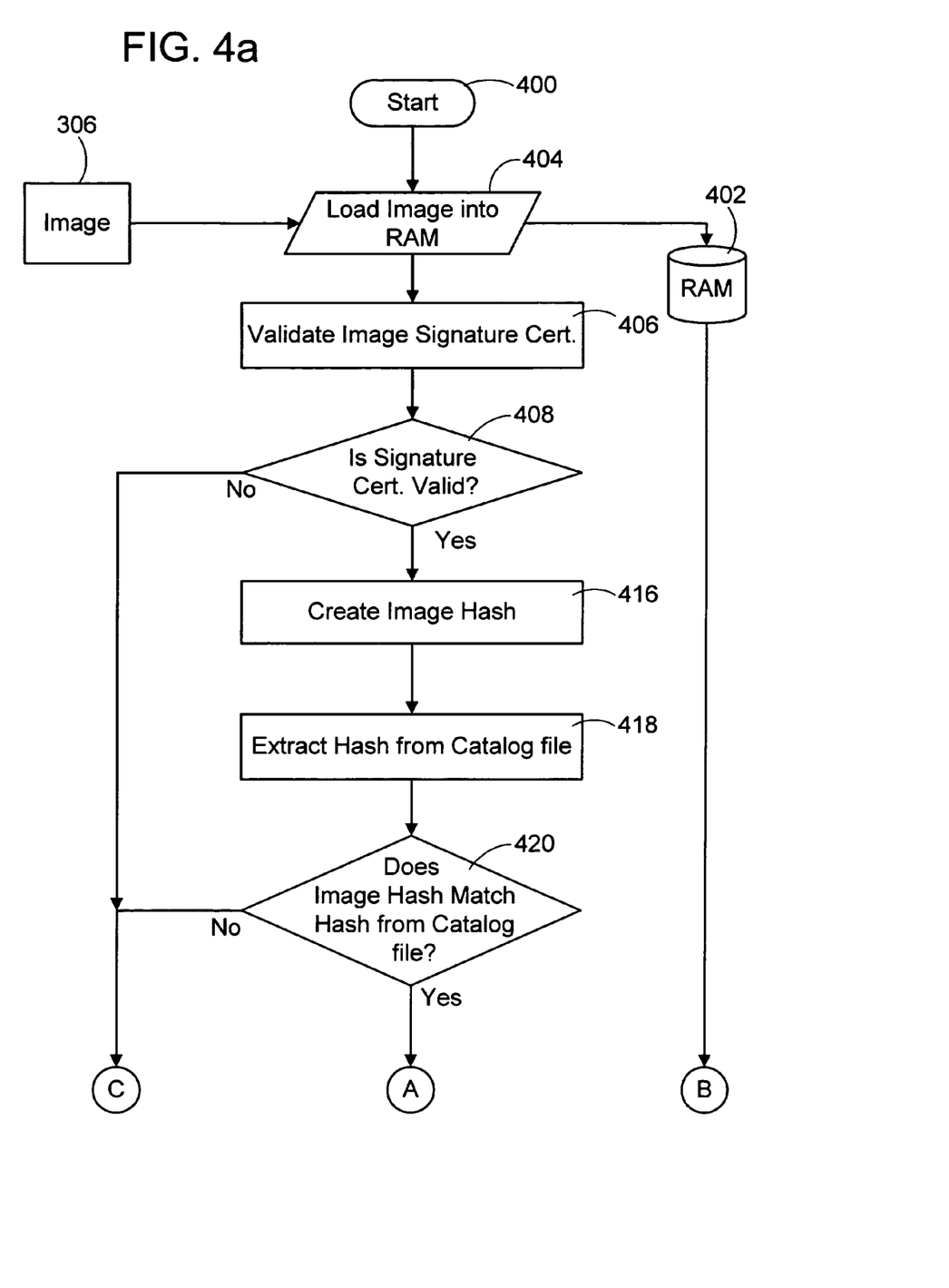
FIG. 4a-b is a simplified flow diagram illustrating a reset device image verification process in accordance with an aspect of the present invention.
Figure 4B:
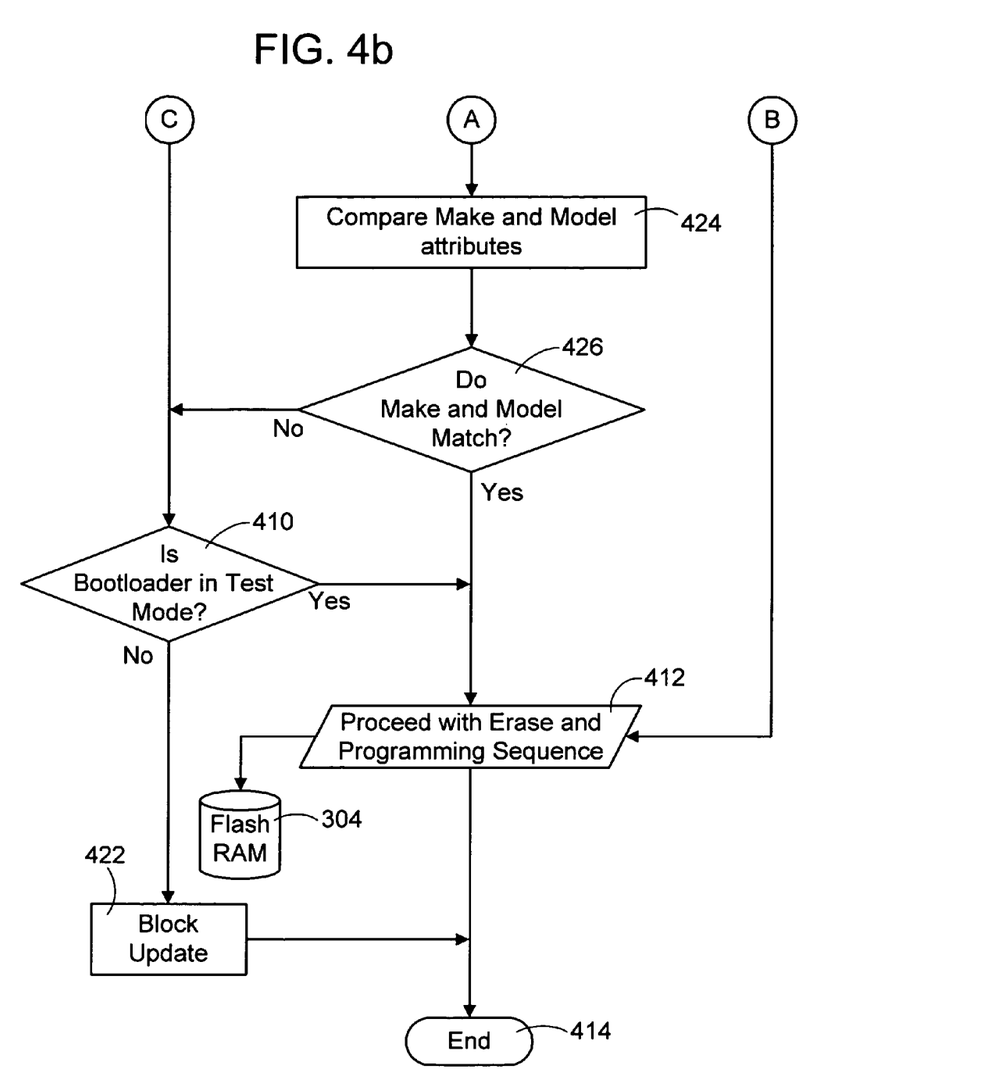

This Image Update Signature Sequence may be better appreciated with reference to FIG. 4. As illustrated in this flow diagram, once the Image Update Signature Sequence begins 400, the bootloader 300 (see FIG. 3) loads the image 306 into the device's random access memory (RAM) 402 at step 404. The crypto module 308 of the bootloader 300 validates the signature certification of the image at step 406. This signature validation may utilize various well know techniques, depending on the type of signature certification provided. A discussion of these various techniques is, therefore, beyond the scope of this application and will be forgone in the interest of brevity. If, at step 408, the signature could not be validated or if there is no signature certification for the image, the bootloader mode is checked as indicated at step 410. If the bootloader operational mode is "test" as determined by step 410, the bootloader 300 may proceed with the erase and programming sequence to install the new image into the device's flash memory 304 at step 412 before ending the process at step 414. However, if the operational mode is not test, i.e. the device is in run mode, the update is blocked at step 422 before ending the sequence at step 414. If an update is blocked, there will preferably be an indication of failure, e.g. the network LED flashes an error sequence by the bootloader update code to indicate this state. A reboot will then restart the device using the old image.

Assuming that the signature chain is validated at step 408, the crypto module 308 of the bootloader 300 crates a hash of the image at step 466, and extracts the hash value from the catalog file 310 of the image 306 at step 418. A comparison of these two hash values is then performed at step 420 to determine if they match. If they do not match, this is an indication that there has been some alteration of the image since the signed catalog file 310 was embedded into the image 306. If the bootloader operational mode is "test" as determined by step 410, the bootloader 300 may proceed with the erase and programming sequence to install the new image into the device's flash memory 304 at step 412 before ending the process at step 414. This is allowed, even though there is a clear indication of image alteration, because the device is in the test mode. However, if the operational mode is not test, i.e. the device is in run mode, the update is blocked at step 422 before ending the sequence at step 414. If an update is blocked, there will preferably be an indication of failure, e.g. the network LED flashes an error sequence by the bootloader update code to indicate this state. A reboot will then restart the device using the old image.

Assuming that step 420 is successfully completed, a comparison is made at step 424 of the make and model information of the device (stored in the bootloader 300) and the make and model attributes of the image 306. If the make and model information does not match as determined by step 426, the bootloader mode is again checked as indicated at step 410. If the bootloader operational mode is "test" as determined by step 410, the bootloader 300 may proceed with the erase and programming sequence to install the new image into the device's flash memory 304 at step 412 before ending the process at step 414. However, if the operational mode is not test, i.e. the device is in run mode, the update is blocked at step 422 before ending the sequence at step 416. If an update is blocked, there will preferably be an indication of failure, e.g. the network LED flashes an error sequence by the bootloader update code to indicate this state. A reboot will then restart the device using the old image.

Assuming that the make and model information contained in the bootloader 300 does match the make and model information in the image 306 at step 426, the bootloader 300 proceeds with the erase and programming sequence of step 412 to install the updated image into the device's flash memory before ending the sequence at step 414. This installation proceed regardless of the operational mode of the device because all of the various checks performed all passed. This provides assurance that the image has not been altered maliciously.

As the foregoing makes clear, it is possible to download unsigned images to the device. However, if the images are unsigned and the device is a "release to manufacturing" (RTM) image, the device will not boot, as there is a second crypto check in the Mira shell code 312 (see FIG. 3). If an update is blocked, an indication of the failure to boot, e.g. the network LED flashes an error sequence by the bootloader update code to indicate this state. As discussed above, a reboot will restart the device using the old image.

As introduced above, the second instance which will result in the image's signed catalog file being checked is on a reset. Each time the device is either warm or cold reset, the image will be checked by the crypto module 314 in the Mira shell 312. The crypto module 314 in the Mira Shell binary 312 checks the image's signed catalog 310. The result is passed directly to the binary routine within Mira Shell 312 that controls the generation of the text messages on the main shell screen. If the signature is invalid (for an RTM image), the system will fail to initialize and instead will blue screen. A simple message will be placed on the blue screen indicating that the signed catalog is invalid. However, if the image is a Beta version, the device may still boot, but an appropriate message will be displayed indicating that the signature is not valid. Indeed, for an RTM image, if the operational mode is test and the image signature is a release signature, as opposed to a test signature, the device will not boot. Instead, a message will be displayed on the blue screen indicating that a problem was discovered. The RTM version device will only boot if in the test mode when the image contains a valid test signature.

Placing this second crypto check within the Mira Shell binary 312 makes it very hard for an original device manufacturer (ODM)/original equipment manufacturer (OEM) to comment out or defeat this check. This is because this large binary 312 contains most of the functionality of the portable device, e.g. the Smart Display. An ODM/OEM would need to recreate this binary, sans crypto checks, if they wish to bypass this process. Because of the proprietary code involving some complex interfaces, this would not be any easy task.

As may now be apparent from the foregoing discussion, the system and methods of the present invention allow for both test and release signatures for the image. In this way, a developer may test sign their own images following a simple process. This allows a developer to test sign their image as often as desired and also to provide a test signed image when they submit their final image for Compliance Program testing. This test signing process for a preferred embodiment is illustrated in FIG. 5.

Figure 5:
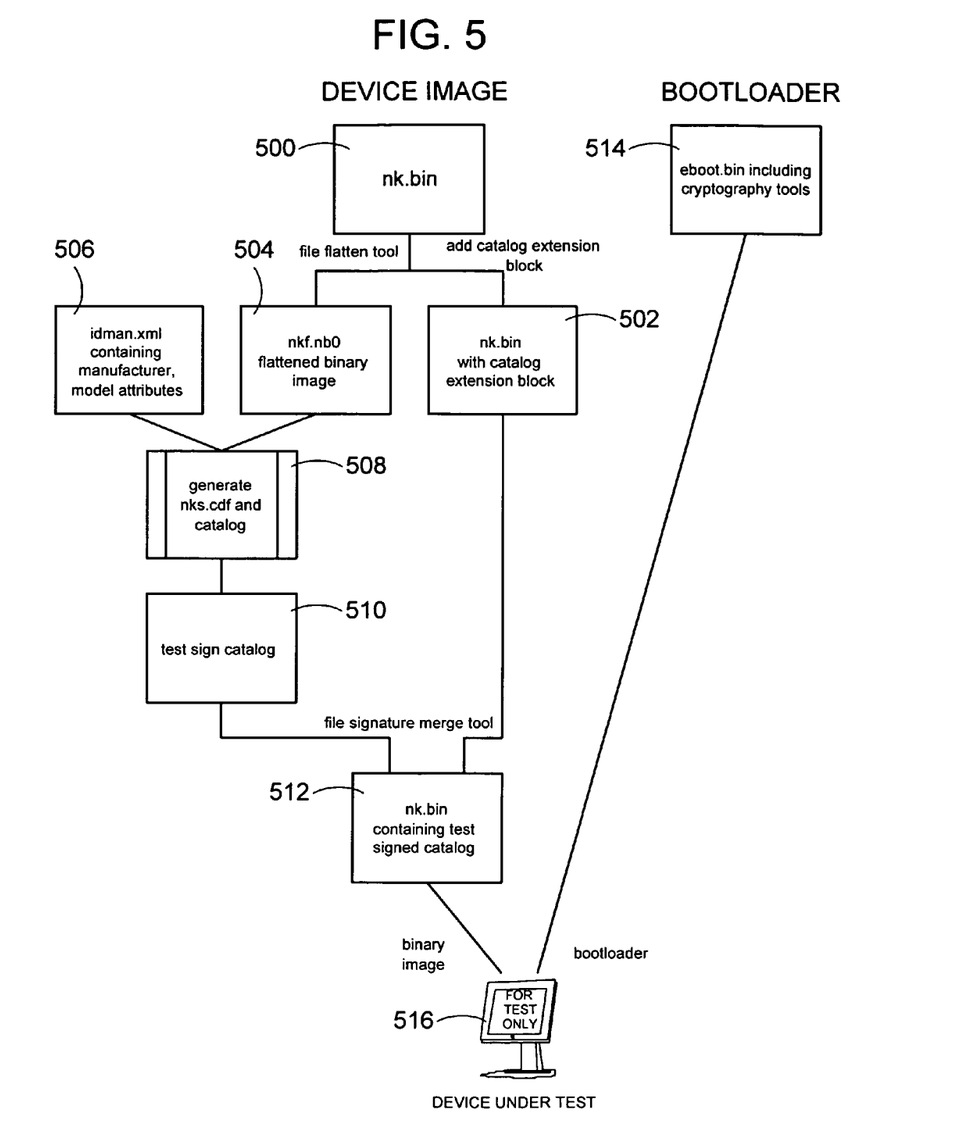
FIG. 5 is a process flow diagram illustrating the generation of a device image including a test signed catalog file in accordance with an aspect of the present invention.

As may be seen from this FIG. 5, the device image file, nk.bin 500, is used to generate, via an add catalog extension block, the file 502, and a flattened binary image nkf.nb0 504 via a file flatten tool. This flattened binary image 504 is combined with a file 506 containing the manufacturer and model attributes. At step 508 the nks.cdf and catalog are generated. The test signed catalog 510 is then merged via a file signature merge tool with the nk.bin with catalog extension block 502 to form the nk.bin image containing the test signed catalog 512. This binary image may be loaded into the device under test 516, along with the bootloader 514 including the cryptographic tools discussed above.

Figure 6:
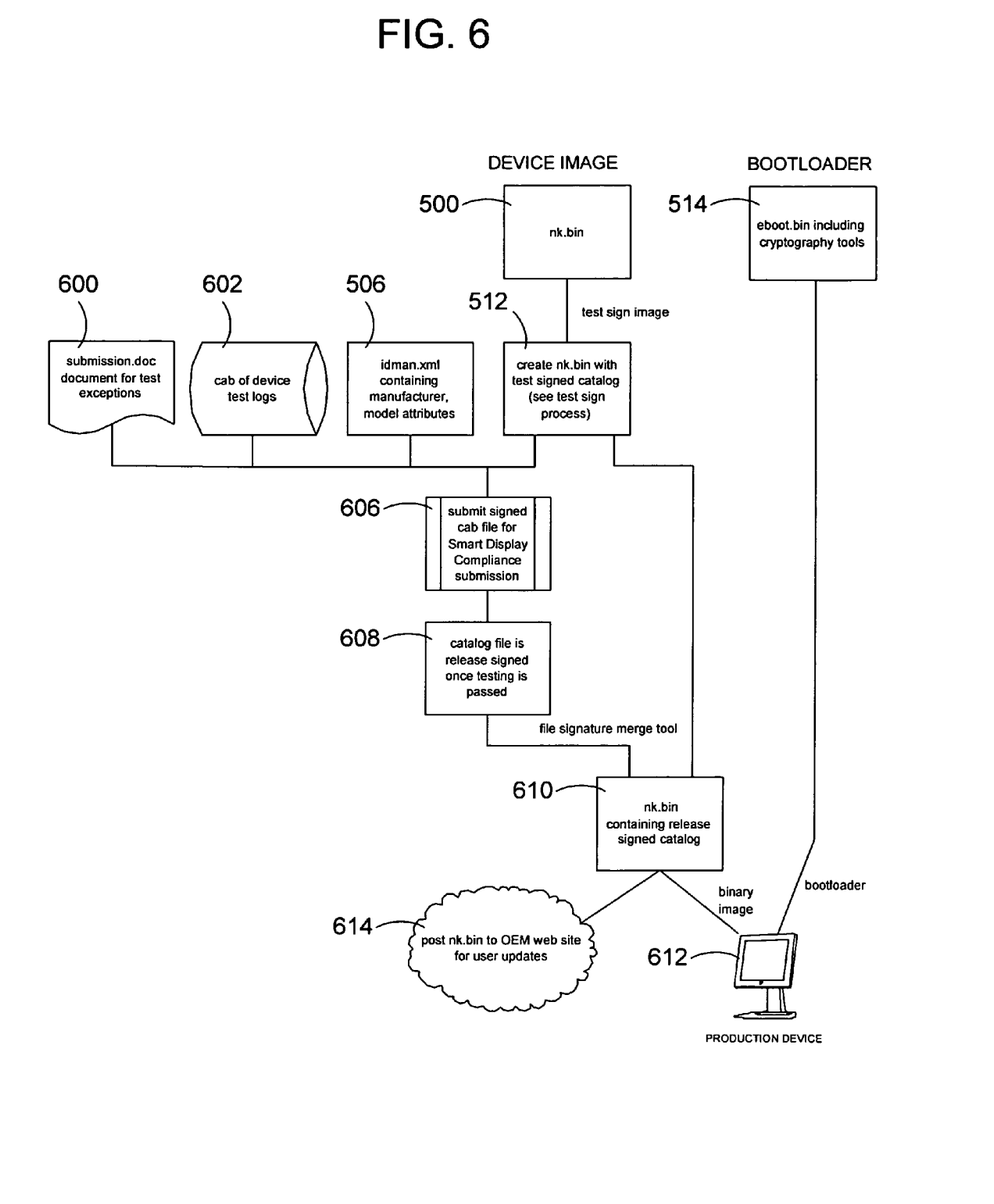
FIG. 6 is a process flow diagram illustrating the generation of a device image including a release signed catalog file in accordance with an aspect of the present invention.

The generation of a release signed catalog file 610 (see FIG. 6) is very similar to that for a test signature discussed above. However, the submitter must include the appropriate test logs 602 and test exceptions 600. Before a release signature will be generated, the device certifying agency will conduct testing in accordance with their Compliance Program criteria 606. Upon successfully fulfilling these requirements, a signed catalog file 608 is created by the certifying agency and returned to the OEM embedded in their nk.bin 610. This nk.bin may then be loaded into the production device 612 and/or posted on the OEM's website 614 for user updates as discussed above.

All of the references cited herein, including patents, patent applications, and publications, are hereby incorporated in their entireties by reference. That is, each and every part of every such reference is considered to be part of this disclosure, and therefore no part of any such reference is excluded by this statement or by any other statement in this disclosure from being a part of this disclosure.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method of file system protection for a resource-sparing operating system image, comprising:
   loading, with a client computing device, a first image of the resource-sparing operating system (OS) that includes processor instructions into random access memory (RAM), the first image including an embedded second image of a catalog file comprising client device attributes;
   creating, with the client computing device, a first hash of the first image;
   extracting with the client computing device a second hash from the second image of the catalog file;
   comparing with the client computing device the first hash and the second hash; and
   validating with the client computing device the use of the first image to boot the computing device if the first hash and the second hash match.

2. The method of claim 1, wherein the comparing includes determining that the first hash and the second hash do not match and blocking the use of the first image to boot the computing device if the first hash and the second hash do not match comprising determining that an operational mode of the computing device is set to a run mode of operation.

3. The method of claim 1, wherein the comparing includes determining that the first hash and the second hash match, and wherein the validating the use of the first image to boot the computing device if the first hash and the second hash match further includes validating a signature certification of the first image.

4. The method of claim 1, further comprising:
   evaluating a signature certification of the catalog file in the second image to determine if the signature certification of the catalog file is valid and blocking the use of the first image to boot the computing device if the first hash and the second hash do not match including blocking the use of the first image to boot the computing device if the signature certification of the catalog file cannot be validated.

5. The method of claim 4, further comprising determining whether an operational mode of the computing device is set to a run mode of operation.

6. The method of claim 1, further comprising:
   extracting first make and model attributes from the second image of the catalog file, comparing the first make and model attributes from the second image of the catalog file with second make and model attributes of the computing device, and blocking the use of the first image to boot the computing device if the first hash and the second hash do not match including blocking the use of the first image to boot the computing device if the first make and model attributes do not match the second make and model attributes.

7. The method of claim 6, further comprising determining whether an operational mode of the computing device is set to a run mode of operation.

8. The method of claim 1, further comprising booting the computing device from a third image of a prior resource-sparing OS already loaded in flash memory of the computing device.

9. A portable computing device, comprising:
   flash memory, the flash memory including a protected area and an unprotected area;
   a bootloader stored in the protected area of flash memory, the bootloader containing a cryptographic module;
   an operating system (OS) image installed in the unprotected area of flash memory;
   random access memory (RAM); and
   wherein the cryptographic module of the bootloader is operative to examine an update image to the OS image to determine if the update image should be programmed into the unprotected area of flash memory to boot the computing device, wherein a signed catalog image is an image of a signed catalog file and is embedded in the update image, wherein the signed catalog file is derived by signing a catalog file, and wherein the cryptographic module is operative to program the update image into the unprotected area of flash memory boot the computing device based on a determined relationship between information extracted from the embedded signed catalog file and one of information about the components of the computing device and information determined from the update image.

10. The device of claim 9, wherein the cryptographic module programs the update image into the unprotected area of flash memory when the device is in test mode.

11. The device of claim 9, wherein the bootloader stores the update image in the RAM until the cryptographic module determines that the update image should be programmed into the unprotected area of flash memory to boot the device.

12. The device of claim 11, wherein the cryptographic module calculates a first hash of the update image, extracts a second hash from the catalog file image, and compares the first hash and the second hash, the cryptographic module blocking use of the update image when the first hash and the second hash do not match.

13. The device of claim 11, wherein the cryptographic module extracts a signature certification from the catalog file and attempts to validate the signature certification, the cryptographic module blocking use of the OS image update when the signature certification cannot be validated.

14. The device of claim 11, wherein the operating system (OS) image is an image of an operating system, wherein the update image is an image of an update file to the OS, wherein the cryptographic module is operative to program the update image into the unprotected area of flash memory boot the computing device based on a determined relationship between information extracted from the signed catalog file and information about the components of the computing device by:
   extracting make and model attributes from the catalog file and comparing them to make and model information for the computing device, and
   blocking use of the update image when the make and model attributes of the catalog file do not match the make and model attributes of the computing device.

15. The device of claim 11, wherein the bootloader erases a current device image from the unprotected area of flash memory and programs the update image into the unprotected area of flash memory when the cryptographic modules determines that the update image may be used to boot the device.

16. The device of claim 9, wherein a second cryptographic module of a Mira shell is operative upon a reset of the computing device to examine the installed operating system image to determine if the installed operating system image should be used to boot the computing device based on information included in the signed catalog file.

17. The device of computing claim 16, wherein the cryptographic module in the Mira shell calculates a first hash of the installed operating system image, extracts a second hash from the catalog image, and compares the first hash and the second hash, the cryptographic module in the Mira shell blocking use of the update image when the first hash and the second hash do not match.

18. The device of computing claim 16, wherein the cryptographic module in the Mira shell extracts a signature certification from the catalog file and attempts to validate the signature certification, the cryptographic module in the Mira shell blocking use of the installed operating system image when the signature certification cannot be validated.

19. The computing device of claim 16, wherein the cryptographic module in the Mira shell extracts make and model attributes from the catalog file and compares them to make and model information for the computing device, wherein the operating system image is an image of an operating system for the computing device, the cryptographic module in the Mira shell blocking use of the installed operating system image when the make and model attributes of the installed operating system do not match the make and model attributes of the computing device.

20. The computing device of claim 16, wherein the cryptographic module in the Mira shell allows the installed operating system image to be used to boot the computing device when the computing device is in test mode.

* * * * *